US 6,683,855 B1

(12) United States Patent
Bordogna et al.

(10) Patent No.: US 6,683,855 B1
(45) Date of Patent: Jan. 27, 2004

(54) FORWARD ERROR CORRECTION FOR HIGH SPEED OPTICAL TRANSMISSION SYSTEMS

(75) Inventors: Mark Aldo Bordogna, North Andover, MA (US); Ralf Dohmen; Wolfram Sturm, both of Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/143,781

(22) Filed: Aug. 31, 1998

(51) Int. Cl.$^7$ .................................. H04J 1/16
(52) U.S. Cl. ........................ 370/244; 714/746
(58) Field of Search ......................... 370/244, 465, 370/474, 503, 351, 352, 241, 242, 356, 389; 714/746, 747, 751, 752, 753, 754, 758, 759, 764; 375/243, 253, 250, 246; 359/139, 147

(56) References Cited

U.S. PATENT DOCUMENTS

| 5,574,717 A | * 11/1996 | Tomizawa | .................. 370/254 |
| 5,719,883 A | * 2/1998 | Ayanoglu | .................. 370/244 |
| 5,930,273 A | * 7/1999 | Mukojima | .................. 370/244 |

FOREIGN PATENT DOCUMENTS

JP          6-318931 A    11/1994   ............. H04L/1/00

* cited by examiner

*Primary Examiner*—Dang Ton
(74) *Attorney, Agent, or Firm*—Gregory J. Murgia

(57) ABSTRACT

Memory requirements and processing delays associated with the application of forward error correction in high speed optical transmissions are substantially reduced by mapping a forward error correction code on a row-by-row basis into unused overhead bytes in a high bit rate signal frame. By applying the forward error correction code to an entire row of the signal frame on a row by row basis, approximately one row needs to be stored at a time thereby reducing the total memory requirements for forward error correction processing. Using SONET as an exemplary application, approximately ⅑th of the entire SONET frame (e.g., one of nine rows) needs to be buffered for forward error correction processing. In an illustrative embodiment, four forward error correction (FEC) blocks are provided for each row for a total of 36 FEC blocks for a frame. Each FEC block comprises four bytes of correction bits for a total of 32 correction bits. These 32 correction bits are mapped to unused overhead and are used for correcting errors in one block of one row of a signal frame, wherein one block covers ¼th of the row. Other unused overhead bytes in the row can be used to carry error detection codes for detecting multiple errors in a row to determine when forward error correction should be disabled. For example, if a single bit error correcting code is employed, then error correction can be disabled to avoid false corrections if more than one error is detected.

27 Claims, 8 Drawing Sheets

100

300

325

350

400

500

600

FORWARD ERROR CORRECTION FOR HIGH SPEED OPTICAL TRANSMISSION SYSTEMS

FIELD OF THE INVENTION

This invention relates generally to optical transmission systems and, more particularly, to error correction schemes for high speed optical transmission systems.

BACKGROUND OF THE INVENTION

Optical transmission systems that operate at high transmission rates, such as Synchronous Optical Network/Synchronous Digital Hierarchy (SONET/SDH) systems operating at 10 Gb/s, are known to be susceptible to signal-to-noise error impairments as well as impairments associated with optical amplifiers. Among other problems, these impairments can cause unacceptable bit error rates on high speed optical links which carry both voice and data traffic. For example, when multiple fiber optical amplifiers are cascaded in a long haul optical communication system, the resulting noise accumulation from the fiber optical amplifiers imposes a floor on the bit error rate performance of a link (i.e., lowest attainable bit error rate).

Forward error correction (FEC) has been in use for many years to improve channel reliability in communication systems. However, applying forward error correction in SONET/SDH systems presents many challenges. In particular, inserting a forward error correction code into SONET/SDH transmission frames is very difficult given the limited amount of unused overhead. Furthermore, forward error correction schemes require a substantial amount of memory for buffering large amounts of data at the receiver in a SONET/SDH system. Delays associated with processing forward error correction in a SONET/SDH system are also a problem, especially for higher rate systems.

In one proposed scheme described by W. Grover et al. in *Design and Characterization of an Error-Correcting Code for the SONET STS-1 Tributary*, IEEE Transactions on Communications, Vol. 38, No. 4, Apr. 1990, forward error correction is applied on a Synchronous Transport Signal basis whereby an entire STS-1 frame is mapped into a forward error correction block. Because an entire frame must be buffered, the delay is approximately 125 $\mu$s or more. This scheme also requires unused overhead bytes in an STS-1 frame for carrying the forward error correction code. As is well known, unused overhead in an STS-1 frame is very limited. Scaling to higher rates using this STS-1 based error correction scheme is problematic due to implementation complexity, buffering requirements, and processing delays. In particular, as the transmission rate increases, the number of required forward error correction blocks increases thus increasing the amount of buffering and associated processing delays. For example, applying this error correction scheme to a STS-192 signal would require 192 blocks (i.e., independent forward error correction algorithms) and 192 logical buffers with a total buffer size approaching one million bits.

In another proposed scheme, a forward error correction code is applied over three rows of a SONET STS-3 signal (e.g., one-third of a frame). Although this approach requires less overhead as compared to the previous approach, this scheme still requires buffering for one-third of a frame with an associated delay of approximately 45 $\mu$s. Furthermore, this scheme also requires multiple forward error correcting algorithms for processing the 3-row block. Scaling to higher rates is also problematic for the same reasons previously set forth. For example, applying this error correction scheme to a STS-192 signal would require parallel processing of at least 64 forward error correction algorithms and buffering for approximately 414,720 bits.

U.S. Pat. No. 5,574,717 describes an approach for applying error correction to a Synchronous Digital Hierarchy (SDH) Synchronous Transport Module (STM-1) signaling structure, which is equivalent in rate to a SONET STS-3c signal (e.g., 155 MB/s). Scaling to higher rates such as a STM-64 signal, which is equivalent in rate to a SONET STS-192 signal, is also problematic because of buffering requirements (e.g., an entire frame) and delay (e.g., approximately 125 $\mu$s). Moreover, this scheme would require parallel processing of 64 forward error correction algorithms.

SUMMARY OF THE INVENTION

Memory requirements and processing delays associated with the application of forward error correction in high speed optical transmissions are substantially reduced according to the principles of the invention by mapping a forward error correction code on a row-by-row basis into unused overhead bytes in a high bit rate signal frame. By applying the forward error correction code to an entire row of the signal frame on a row by row basis, approximately one row needs to be stored at a time thereby reducing the total memory requirements for forward error correction processing. Using SONET as an exemplary application, approximately 1/9th of the entire SONET frame (e.g., one of nine rows) needs to be buffered for forward error correction processing as compared with an entire SONET frame or one-third of a SONET frame as in prior arrangements. Less memory translates to lower cost and less complexity for implementing forward error correction. Furthermore, delay is reduced as a result of the reduced buffering requirements and processing.

In one illustrative embodiment of the invention, four forward error correction (FEC) blocks are provided for each row for a total of 36 FEC blocks for a frame. Each FEC block comprises four bytes of correction bits for a total of 32 correction bits. These 32 correction bits are mapped to unused overhead and are used for correcting errors in one block of one row of a signal frame, wherein one block covers 1/4th of the row. Other unused overhead bytes in the row may be used to carry error detection codes to facilitate the judicious control of forward error correction. In particular, error detection techniques, such as bit interleaved parity (BIP), cyclic redundancy checks (CRC), and the like, can be used for detecting multiple errors in a row to determine when forward error correction should be disabled. For example, if a single bit error correcting code is employed, then error correction can be disabled to avoid false corrections if more than one error is detected. Other unused overhead bytes may also be used to provide in-band maintenance capabilities, e.g., to carry control bytes for causing error correction to be appropriately enabled or disabled at the receiver.

Using a row-by-row mapping approach yields a significant reduction in delay and reduces the amount of memory needed for error correction processing as compared with the prior arrangements. For example, because only one row needs to be buffered and processed at a time, delay for a 10 Gb/s STS-192 signal can be reduced to approximately 15 $\mu$s is or less (approximately 1/9th of a 125 $\mu$s frame) and memory can be reduced to approximately 17K bytes, both of which are significant improvements over existing forward error correction schemes contemplated for SONET/SDH systems. Moreover, the mapping scheme according to the principles of the invention uses significantly less overhead and does not require parallel processing of a large number of forward error correction algorithms as in prior arrangements. Advantageously, the mapping scheme maintains the structure of the signal and is suitable for various payload rates, e.g., STS-3/3c, STS-12/12c, STS-48/48c, STS-192/192c, as well as higher rate signals that may be used in future applications.

BRIEF DESCRIPTION OF THE DRAWING

A more complete understanding of the principles of the invention may be obtained from consideration of the following detailed description in conjunction with the drawing, with like elements referenced with like references, in which.

DETAILED DESCRIPTION OF THE INVENTION

Although the illustrative embodiments described herein are particularly well-suited for a SONET/SDH STS-192/STM-64 (10 Gb/s) signal structure, and shall be described in this exemplary context, those skilled in the art will understand from the teachings herein that the principles of the invention may also be employed with other signal rates as well as other signal structures. Accordingly, the embodiments shown and described herein are only meant to be illustrative and not limiting. It should be noted, however, that while the principles of the invention can be applied to lower rate SONET/SDH signals, it is generally understood that lower rate signals may not be as susceptible to optical impairments as the higher rate signals.

In general, applying forward error correction involves two primary considerations. First, an appropriate forward error correction algorithm must be selected that provides the appropriate data redundancy for correcting errors to improve the overall bit error rate performance of the system. There are many well-known forward error correction algorithms that can be used in conjunction with the principles of the invention to provide single bit error correction, multiple bit error correction, and so on. By way of example only, some of these well-known algorithms include Hamming codes, Reed-Solomon codes, BCH (Bose-Chaudhuri-Hocquenghem) codes, and the like. The selection of an appropriate forward error correction algorithm will depend on the level of bit error correction required for the application as well as other factors that are well-known to those skilled in the art.

Secondly, an approach must be selected for mapping the forward error correction algorithm to the network signaling structure. The embodiments of the invention shown and described herein are directed towards the second consideration, that is, a mapping scheme for placing forward error correction in a high rate optical signal. For illustrative purposes only, the network signaling structure described herein will be a SONET STS-192 (10 Gb/s) signal although other signal rates and structures are contemplated by the teachings of the invention.

Figure 1:
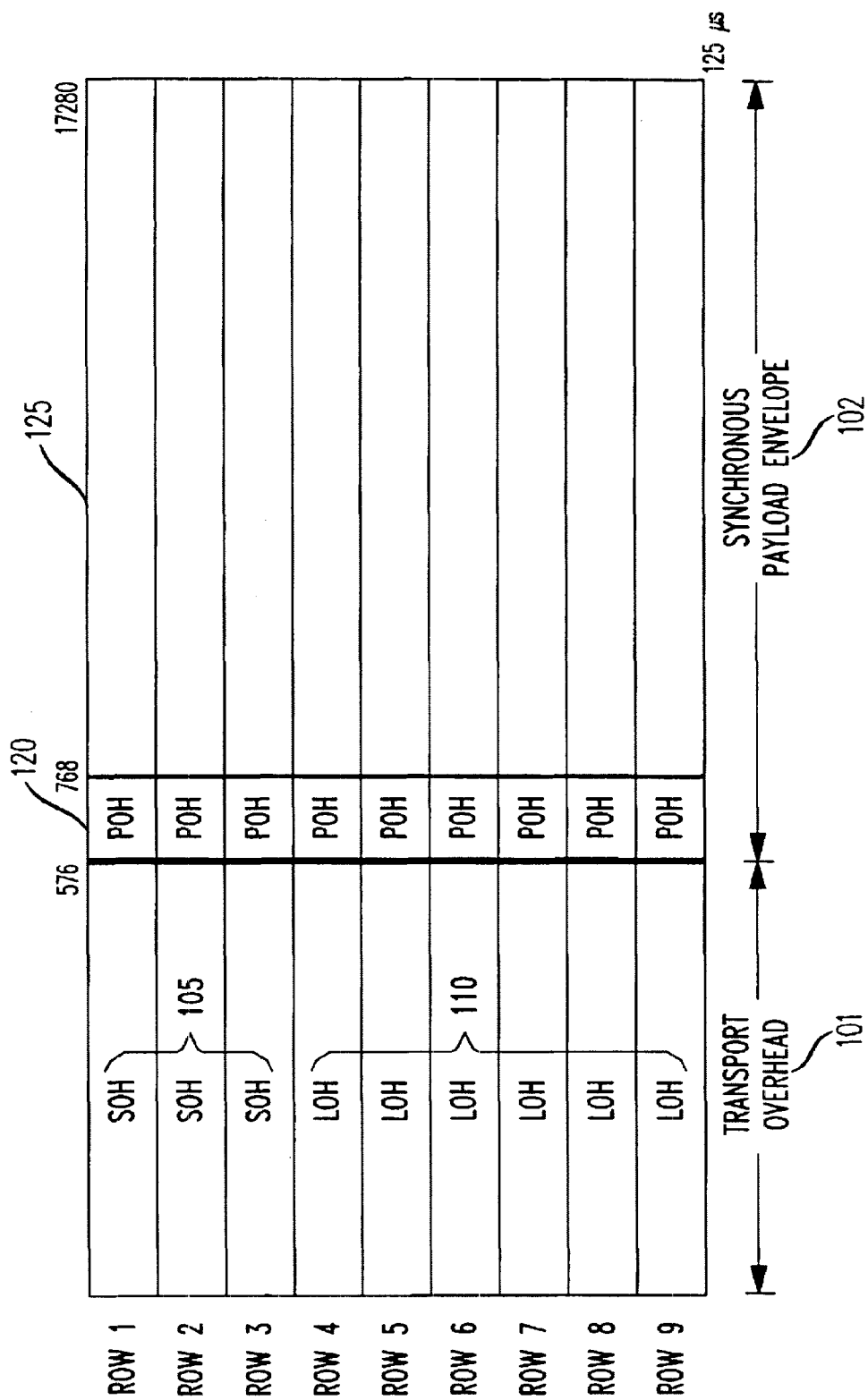
FIG. 1 is a simplified block diagram showing an example of a typical SONET STS-192 signal frame.

FIG. 1 shows a typical SONET STS-192 signal frame 100 that is 125 μsec in duration and comprises 9 rows and 17,280 columns (i.e., bytes). The format of frame 100 is well-known and well-documented in numerous SONET-based standards. As shown, the first 576 columns of rows 1–9 carry bytes for transport overhead 101 while the remainder of the columns carry bytes for synchronous payload envelope (SPE) 102. As is well-known, transport overhead 101 comprises section overhead 105 in rows 1–3 and line overhead 110 in rows 4–9 while synchronous payload envelope 102 includes path overhead 120 in the first 192 columns and payload data 125 in the remainder of the columns. SONET STS-192 frame 100 has a signal rate of approximately 10 Gb/s.

Figure 2:
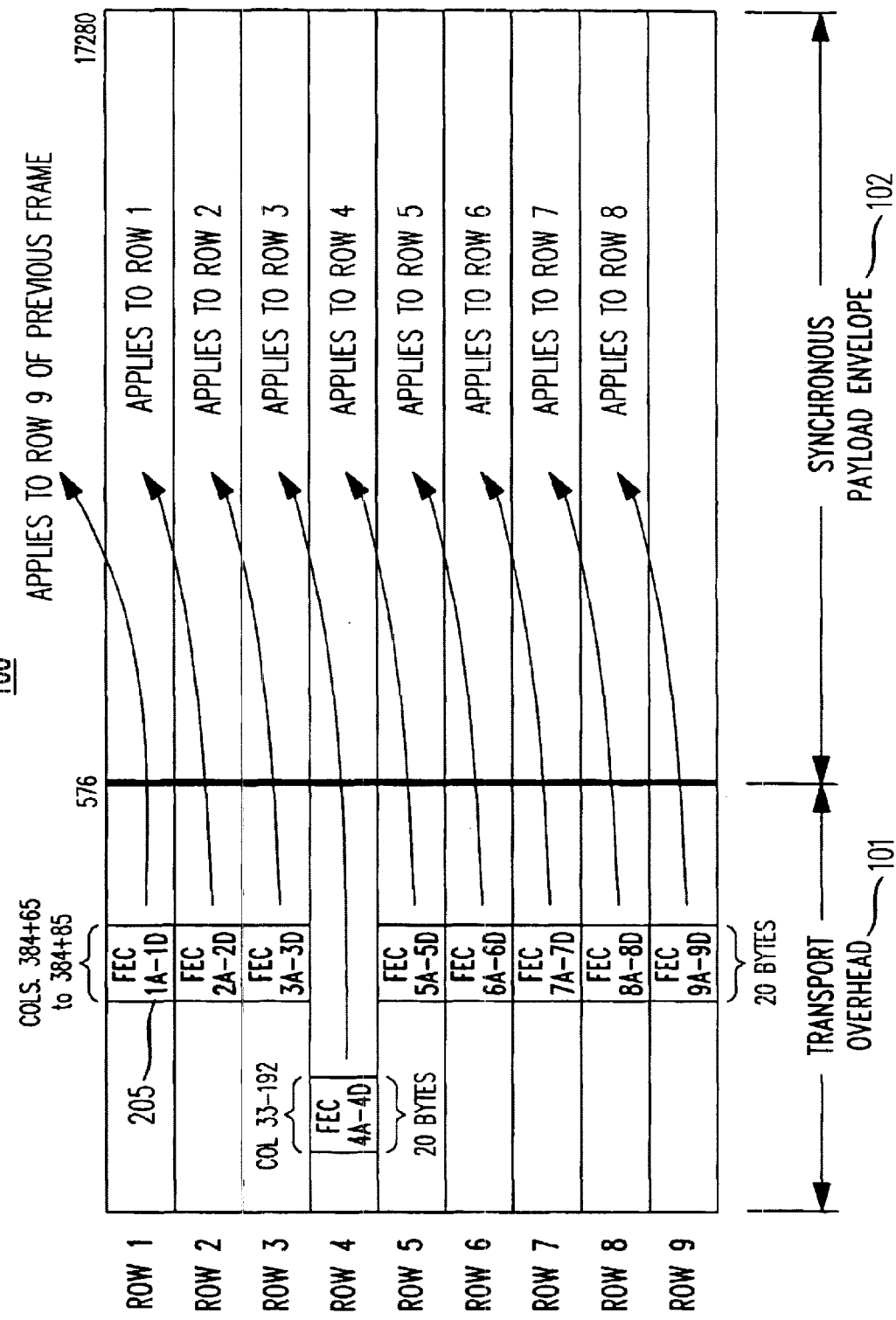
FIG. 2 is a simplified block diagram showing one illustrative embodiment of the forward error correction mapping scheme for a SONET STS-192 signal according to the principles of the invention.

FIG. 2 is a simplified block diagram showing one illustrative embodiment of the forward error correction mapping scheme as applied to SONET STS-192 signal frame 100. In general, forward error correction is applied to signal frame 100 by mapping forward error correction bytes into transport overhead 101 on a row-by-row basis as follows. Four (4) forward error correction (FEC) blocks 205 are provided for each row for a total of 36 FEC blocks for frame 100. FEC blocks 205 are represented as $FEC_{XY}$, where X represents the row number (shown as 1–9) and Y represents the block number within the row (shown as A, B, C, and D). Illustratively, FEC 1A–1D represents FEC blocks for row 1, FEC 2A–2D for row 2, and so on. As shown, FEC blocks 205 in a particular row apply to the immediately preceding row, i.e., FEC blocks 1A through 1D cover row 9 of the previous frame, FEC blocks 2A through 2D cover row 1 of the current frame, and so on. The location of FEC blocks 205 within transport overhead 101 will be described in more detail below.

According to the principles of the invention, forward error correction can be applied to the entire frame 100 so that errors can be corrected in both transport overhead 101 and payload 102, with some exceptions that will be noted below. Because 4 FEC blocks cover each row, each FEC block therefore covers ¼th of a row or 34,560 bits, i.e., $$\frac{(17{,}280 \text{ bytes/row}) \times (8 \text{ bits/byte})}{4 \text{ blocks/row}}.$$

Illustratively, FEC block 2A in row 2 covers ¼th of the bits found in row 1. As will be described in more detail below, FEC block 2A in row 2 covers the FEC correction bits in row 2 and not the FEC correction bits from row 1.

It should be noted that FIG. 2 only shows one exemplary embodiment according to the principles of the invention. Other variations and modifications will be apparent to those skilled in the art and are contemplated by the teachings herein. For example, more than four (4) FEC blocks may be used or as few as one (1) FEC block may be used for each row. Deciding on the appropriate number of FEC blocks for each row will depend on several considerations, including the type of forward error correction code being used, available overhead in the row, and the state of technology being used for device implementation, to name a few. In any case, the complexity associated with parallel processing forward error correction algorithms is substantially reduced according to the principles of the invention as compared with the prior arrangements. Using four (4) FEC blocks per row as an example, only four forward error correction processes must be carried out at a time because row-by-row processing allows for the reuse of the same forward error correction circuitry for each row.

Figure 3A:
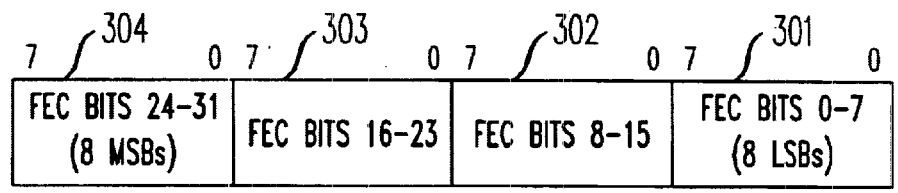
FIGS. 3A, 3B, and 3C are simplified block diagrams of the forward error correction byte assignments according to one exemplary embodiment of the invention.

FIG. 3A shows one example of byte assignments for a single FEC block 300 according to one illustrative embodiment of the invention. As shown, FEC block 300 comprises four (4) bytes 301–304 of correction bits for a total of 32 correction bits. These 32 correction bits are used for correcting errors in one block of one STS-192 row, wherein one block comprises ¼th of the row or 34,560 bits. Consequently, four (4) FEC blocks 300 are used for correcting errors in the entire STS-192 row. It should be noted that 32 correction bits is only one exemplary embodiment for a FEC block and more correction bits may be used depending on the type and strength of the forward error correcting code selected.

In addition to the correction bits which are used for correcting errors in the corresponding blocks of data within each row, error detection code can also be mapped along with the correction bits into the corresponding transport overhead of the rows. For example, error detection techniques such as bit interleaved parity (BIP), cyclic redundancy checks (CRC), and other well-known coding techniques for detecting multiple errors can be employed to ensure that forward error correction is only enabled when the number of errors in a row does not exceed the bit error correction capability of the forward error correction code being used. For simplicity of explanation, 8-bit interleaved parity (BIP-8) will be used as an exemplary embodiment. It should be noted, however, that this particular embodiment is only meant to be illustrative and not limiting.

Figure 3B:
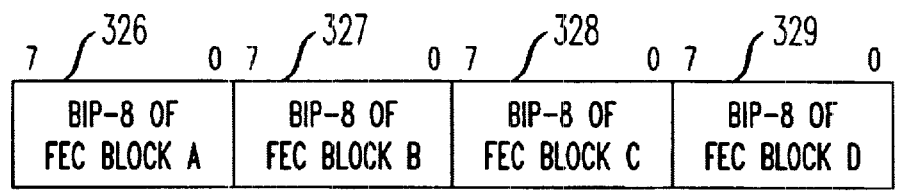

FIG. 3B shows one possible implementation for bit interleaved parity (shown here as BIP-8) which can be used to provide parity over the corresponding blocks of data plus the FEC correction bits. As shown, BEP-8 block 325 comprises four (4) bytes 326–329 of BIP-8 parity bits, wherein each byte of BIP-8 parity bits corresponds to one of the FEC blocks 300 in a row, e.g., FEC blocks A, B, C, and D. Consequently, each BIP-8 parity byte 326–329 provides parity over 34,560 bits in a row, including 32 FEC correction bits corresponding to a FEC block. As will be described in more detail below, BIP-8 parity can be used for judiciously controlling when forward error correction is enabled and disabled. For example, if BIP-8 parity detects multiple errors in a row that exceeds the capability of the forward error correction algorithm, i.e., 3 errors detected when the algorithm has 2 bit error correction capability, then forward error correction can be disabled to prevent any miscorrections or false corrections.

Figure 3C:
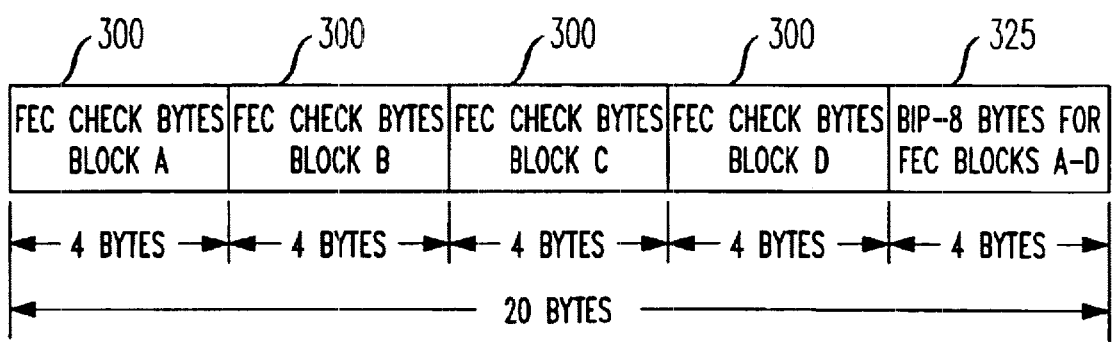

FIG. 3C shows an exemplary FEC mapping 350 corresponding to an entire row of the STS-192 signal. As shown in this embodiment, FEC mapping 350 includes a total of 20 FEC bytes mapped into each row. More specifically, FEC mapping 350 comprises four (4) FEC blocks 300, each having four (4) FEC bytes as shown in FIG. 3A and corresponding to ¼th of a row, and a BIP-8 block 325, which includes four (4) BIP-8 parity bytes as shown in FIG. 3B for providing parity over the four (4) FEC blocks 300 and corresponding data. As such, 20 bytes of transport overhead are required in each STS-192 row to carry the FEC correction bits and BIP-8 parity bits in FEC mapping 350.

It should be noted that the above byte definitions illustrate just one example for mapping forward error correction into a STS-192 signal. Other modifications can be made consistent with the teachings herein. For example, the byte definitions may vary depending on the strength of the particular forward error correction algorithm selected. For the most efficient use of unused overhead to carry forward error correction bytes according to this mapping scheme, it is contemplated that the selected forward error correction algorithm should not use more than 24 overhead bytes per row although more unused overhead is available as will be described below.

Referring again to FIG. 2, one illustrative embodiment is shown for the specific placement, i.e., row/column mapping, of the FEC bytes into the transport overhead of STS-192 frame 100. The specific placement of FEC bytes as shown in this embodiment provides one optimized solution for mapping forward error correction, however, this embodiment is only intended to be illustrative and not limiting as other alternative placements are possible. For optimum mapping of the FEC bytes in STS-192 frame 100, placement of FEC bytes in row 4 should be handled differently than placement of FEC bytes in rows 1–3 and 5–9 because of the lack of unused overhead in row 4 of STS-192 frame 100.

As shown in FIG. 2, FEC bytes are placed in unused section overhead for rows 1–3 and in unused line overhead for rows 5–9 of STS-192 frame 100. For completeness, the detailed placements of FEC bytes in these rows will also be described with reference to the equivalent rate SDH signal, i.e., 10 Gb/s STM-64 signal. The format of an SDH STM-64 frame is well-known and well-documented in SDH-related standards. As such, references to specific mapping locations in both SONET and SDH formats will be understood by those skilled in the art.

In particular, FEC bytes 205 corresponding to block A in rows 1–3 and 5–9 (i.e., FEC 1A, 2A, 3A, 5A, 6A, 7A, 8A, 9A) are mapped to columns 449 through 452 (384+65 through 384+68) and to column 465 (384+81). For the SDH equivalent STM-64 signal, these FEC bytes are mapped to locations S (1–3 and 5–9, 8, 1–4 and 17) where S (x, y, z) is defined with x=row (1–9), y=multi-column (1–9), and z=depth (1–64). Similarly, FEC bytes 205 corresponding to block B in rows 1–3 and 5–9 (i.e., FEC 1B, 2B, 3B, 5B, 6B, 7B, 8B, 9B) are mapped to columns 453 through 456 (384+69 through 384+72) and to column 466 (384+82). For the SDH equivalent STM-64 signal, these FEC bytes are mapped to locations S (1–3 and 5–9, 8, 5–8 and 18). FEC bytes 205 corresponding to block C in rows 1–3 and 5–9 (i.e., FEC 1C, 2C, 3C, 5C, 6C, 7C, 8C, 9C) are mapped to columns 457 through 460 (384+73 through 384+76) and to column 467 (384+83). For the SDH equivalent STM-64 signal, these FEC bytes are mapped to locations S (1–3 and 5–9, 8, 9–12 and 19). Finally, FEC bytes 205 corresponding to block D in rows 1–3 and 5–9 (i.e., FEC 1D, 2D, 3D, 5D, 6D, 7D, 8D, 9D) are mapped to columns 461 through 464

(384+77 through 384+80) and to column 468 (384+84). For the SDH equivalent STM-64 signal, these FEC bytes are mapped to locations S (1–3 and 5–9, 8, 13–16 and 20).

Figure 4:
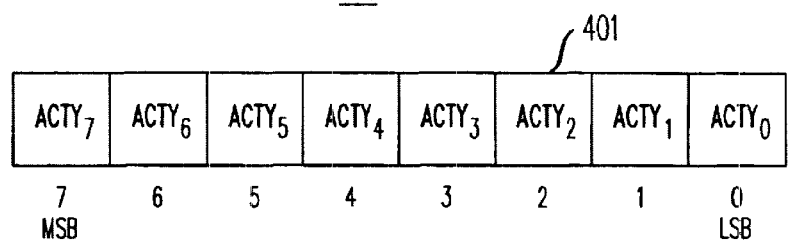
FIG. 4 illustrates one example of a forward error correction start byte according to the principles of the invention.

A FEC start byte 400 (also referred to as a FEC correction control byte) can be used to control the enabling/disabling of forward error correction for all 36 blocks within the SONET frame. In one exemplary mapping scheme, FEC start byte 400 can be mapped to row 1, column 469 (384+85) of the STS-192 frame or in the equivalent STM-64 position S (1, 8, 21). As shown in FIG. 4, an exemplary byte definition for FEC start byte 400 comprises eight (8) activity bits 401. In operation, FEC start byte 400 can be beneficially used if an application requires corrections to be enabled or disabled in-service without causing hits on traffic.

Figure 5:
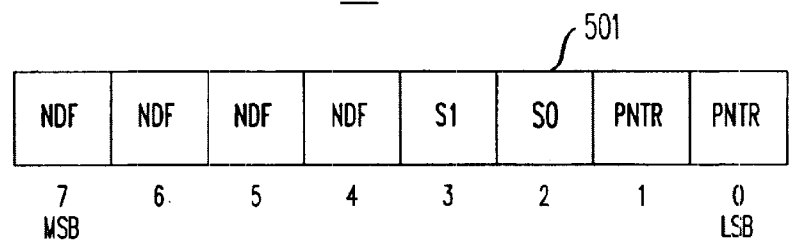
FIG. 5 shows an example of a typical SONET STS-192 byte used for placement of forward error correction bits according to one illustrative embodiment of the invention.
Figure 6:
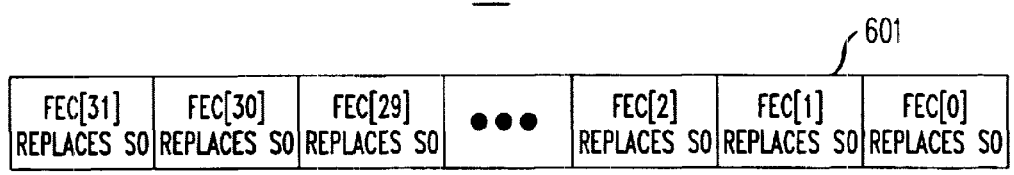
FIG. 6 is a simplified block diagram showing another illustrative embodiment of the mapping scheme for placing selected forward error correction bits in a SONET STS-192 signal according to the principles of the invention.

FIGS. 2, 5, and 6 together illustrate one optimum mapping for FEC bytes in row 4 of frame 100. Because row 4 does not include unused overhead as in rows 1–3 and 5–9, an alternative mapping scheme is contemplated using the H1 bytes in row 4. FIG. 5 shows one typical byte configuration for the H1 byte 500 in row 4. For purposes of this mapping scheme, it is contemplated that the FEC bytes can be carried in S0 bit locations 501 of H1 bytes 500 in row 4. More specifically, S0 bits in 160 succeeding H1 bytes in row 4 line overhead must be used to carry the 20 FEC bytes for row 4 (i.e., 20 bytes×8 bits/byte). FIG. 6 shows a simplified mapping scheme for a single FEC block 600 in row 4, wherein the 32 correction bits replace the contents of the S0 bits at locations 601.

It should be noted that selection of the H1 byte and selection of the S0 bit within the H1 byte to carry the FEC bytes for row 4 represents only one illustrative embodiment. For example, other overhead bytes could be used. Moreover, the S1 bit in the H1 byte could also be used in a similar manner as that described for the S0 bit. In yet another alternative embodiment, both the S0 and S1 bits could be used together so that only half the number of succeeding H1 byte frames (i.e., 80) would be required.

Referring again to FIG. 2, FEC bytes 205 corresponding to blocks A through D in row 4 (i.e., FEC 4A, 4B, 4C, 4D) are mapped to the S0 bit location of the last 160 H1 bytes in the line overhead corresponding to columns 33–192 of STS-192 frame 100 or, in the equivalent SDH signal format, positions S (4, 1, 33) through S (4, 3, 64). More specifically, FEC bytes corresponding to block A in row 4 (i.e., FEC 4A) are mapped to columns 33–64 and 161–168, FEC bytes corresponding to FEC 4B are mapped to columns 65–96 and 169–176, FEC bytes corresponding to FEC 4C are mapped to columns 97–128 and 177–184, and FEC bytes corresponding to FEC 4D are mapped to columns 129–160 and 185–192. It should be noted that, for SDH applications, the SS bit mismatch may need to be disabled for STM-64 interfaces in accordance with applicable standards.

Although the S0 overhead bits in row 4 are overwritten with FEC bytes, these overwritten bytes can be preserved using rearrangements as will be described below. Rearrangements may also be used in anticipatory fashion to accommodate future changes to standards which may result in a presently undefined overhead byte becoming defined for a particular use. One example is the Z0 growth byte that will be described below. Rearrangement is a relatively straightforward process in which the contents of overwritten byte and bit locations are copied and mapped to other time slots, e.g., in a different row, and then subsequently copied and moved back to the original time slots after FEC processing is completed. This rearrangement technique can therefore preserve the contents of overwritten overhead (e.g., S0 bits) as well as currently undefined overhead which may be defined in the future (e.g., Z0 growth bytes). Accordingly, the principles of the invention can be effectively "future proofed" against future changes to the signaling structure and the like.

For example, mapping FEC start byte 400 (FIG. 4) and FEC bytes 205 for blocks A through D in row 1 (i.e., FEC 1A, 1B, 1C, 1D) overwrites the Z0 growth bytes. If these Z0 growth bytes are later defined, then it may become desirable to preserve the contents of incoming Z0 bytes. This can be accomplished through rearrangements whereby the contents of the overwritten Z0 bytes are copied to unused overhead in another row, e.g., "national use" bytes in row 2. After FEC decoding is completed, the contents of the Z0 bytes can be moved back to the original time slots in row 1 in the reverse manner.

Similarly, mapping FEC bytes 205 for row 4 overwrite the S0 pointer bits as previously described. If it becomes necessary to preserve the contents of incoming S0 bits, the contents can be moved to unused overhead in another row, e.g., row 5. After FEC decoding is completed, the contents can be copied back into the S0 bit locations in row 4. The above examples are only illustrative of two possible rearrangement scenarios for preserving the contents of overwritten bits and bytes.

Figure 7:
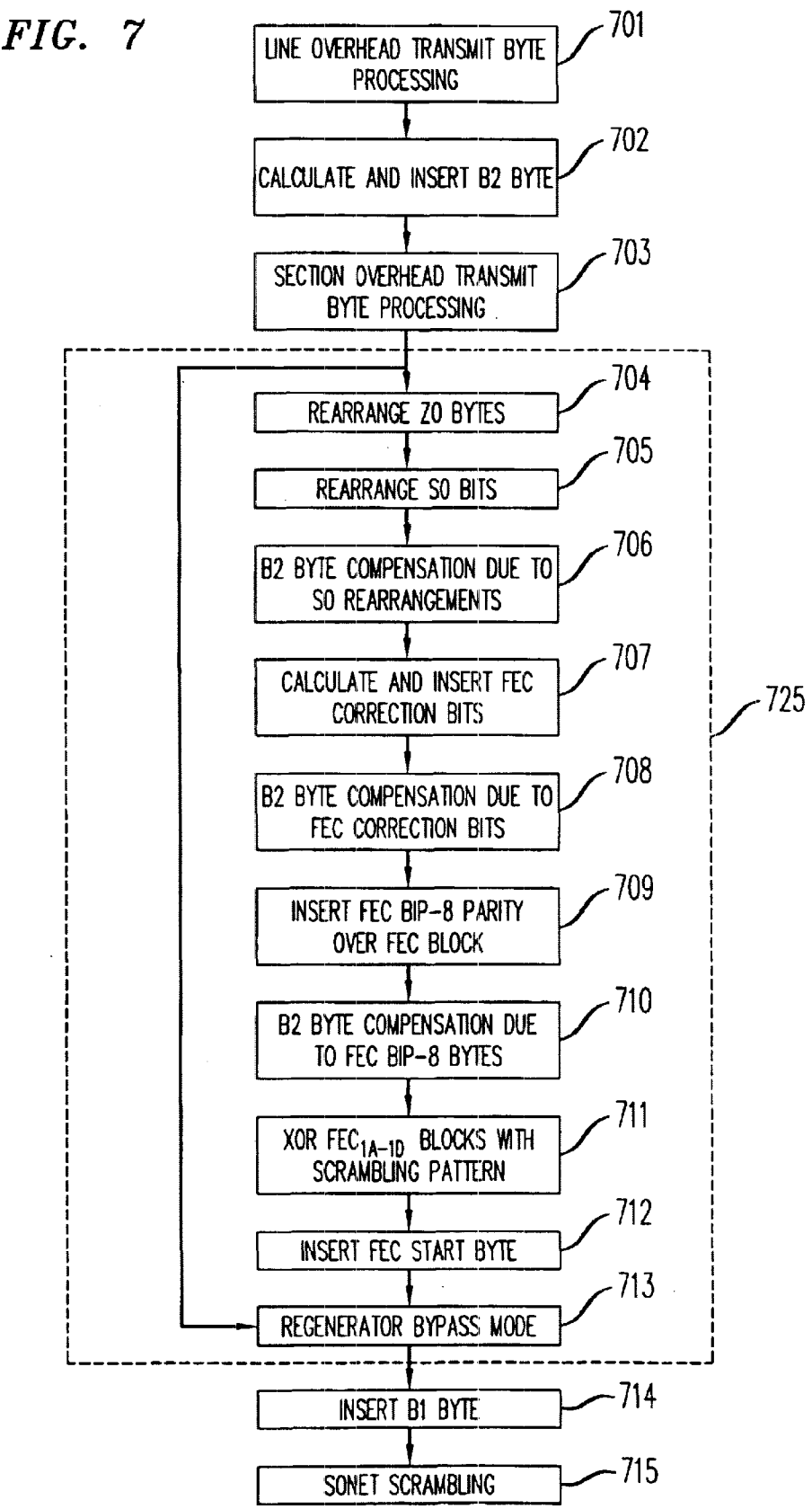
FIGS. 7 and 8 are simplified flow diagrams illustrating the encoding and decoding functions associated with the transmit and receive functions of the system, respectively.
Figure 8:
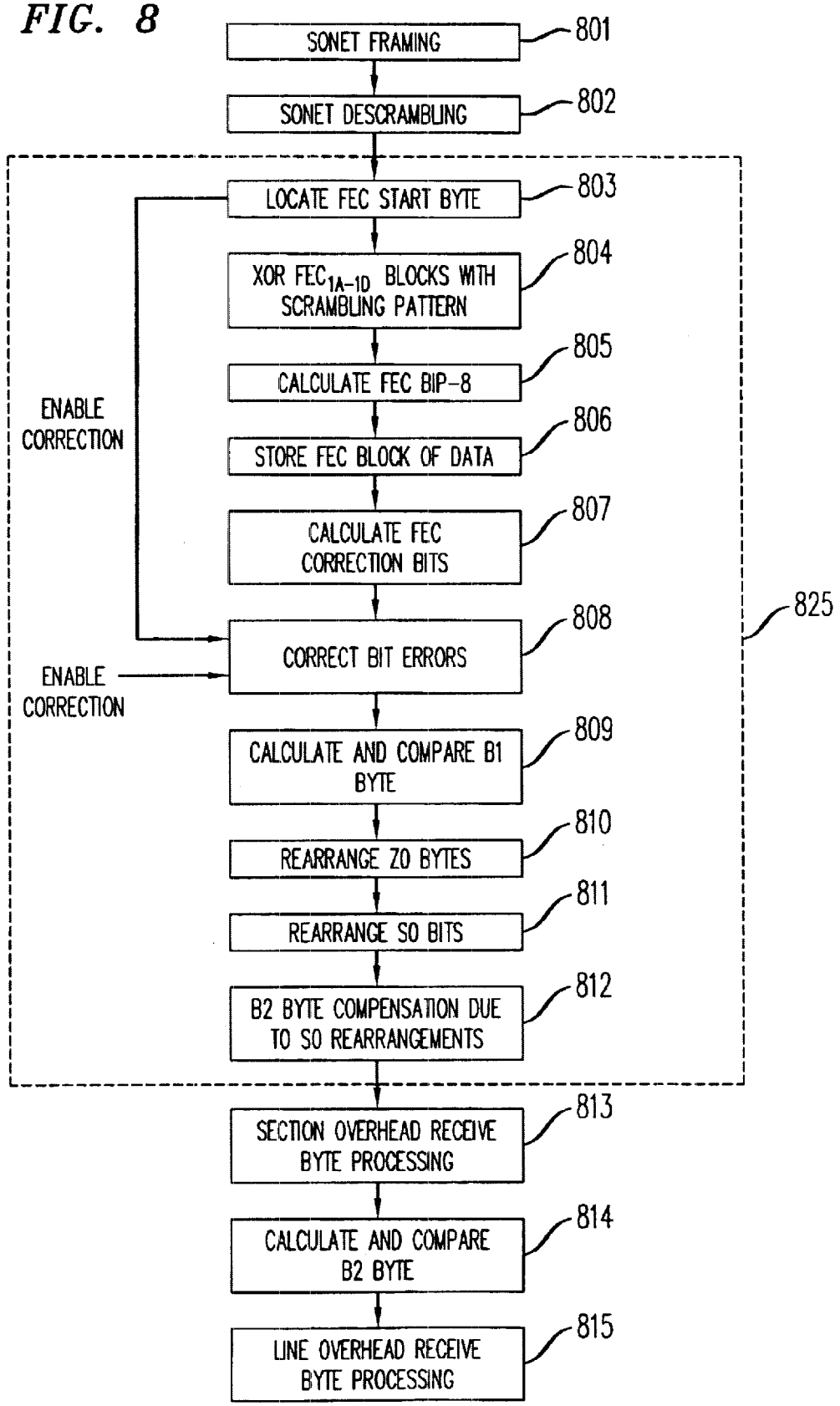

FIGS. 7 and 8 are simplified flow diagrams that illustrate the operation of forward error correction mapping in accordance with one illustrative embodiment of the invention. In particular, FIG. 7 shows FEC encoding functions carried out by FEC encoder 725 relative to the transmit function while FIG. 8 shows FEC decoding functions carried out by FEC decoder 825 relative to the receive function.

In operation, as shown in FIG. 7, line overhead transmit byte processing (block 701), B2 byte calculation and insertion (block 702), and section overhead transmit byte processing (block 703) is carried out using well-known processing techniques in accordance with SONET/SDH-related standards. After section overhead transmit byte processing (block 703), the Z0 bytes are rearranged (block 704) in the manner previously described, e.g., contents of the Z0 bytes from row 1 are copied and inserted into time slots in row 2. Similarly, the S0 bits from the H1 bytes in row 4 are preserved (block 705) by copying and inserting the contents of these bits into row 5. After the S0 bits are rearranged, B2 byte compensation is carried out (block 706) due to the S0 rearrangements. B2 byte compensation will be described in more detail below.

FEC correction bits are then calculated and inserted within the frame as shown in block 707. In particular, the 16 FEC correction bytes (i.e., 4 FEC correction bytes for each block in a row) are mapped into the appropriate locations. It should be noted that the FEC BIP-8 parity bytes are not inserted at this point. After insertion of the FEC correction bits, B2 byte compensation is carried out (block 708) due to FEC correction bit insertion. The FEC BIP-8 parity bytes are then inserted over the corresponding FEC blocks as shown in block 709. B2 byte compensation again is carried out (block 710) due to FEC BIP-8 insertion. Because row 1 overhead is not scrambled like in the other rows, the FEC blocks for row 1, e.g., FEC 1A through 1D, are exclusively OR'd (XOR) with a switchable fixed pattern (as shown in block 711) in order to prevent the occurrence of a string of all zero bits. For example, the fixed pattern could be a one-zero ("10") alternating pattern. The FEC start byte is then inserted as shown in block 712. If a regenerator bypass mode is applicable, represented by block 713, then the FEC overhead bytes, FEC start byte, and rearranged Z0 bytes and S0 bits would pass through unaltered.

B1 byte insertion (block 714) and SONET scrambling (block 715) is then carried out using well-known SONET/SDH processing techniques. For the embodiment shown and described herein, it should be noted that B2 byte compensation (e.g., steps 706, 708, 710) and B1 byte calculation and insertion (step 714) after insertion of the check bits is done to keep the B1 and B2 bytes intact for transmission.

As shown in FIG. 7, the functions of blocks 704 through 713 can be incorporated and embodied in a FEC encoder, represented here functionally as block 725. FEC encoder (block 725) can be implemented using well-known techniques performed by hardware, software, application specific integrated circuits (ASICs), or a combination thereof Referring to FIG. 8, the FEC decoding functions are shown relative to the receive functions of the system. In operation, SONET/SDH framing (block 801) and SONET/SDH descrambling (block 802) are carried out using well-known processing techniques in accordance with SONET/SDH-related standards. After descrambling, the FEC start byte is located (block 803) and, depending on the value of the start byte, forward error correction will either be enabled to allow corrections or disabled as shown. FEC blocks for row 1, i.e., FEC 1A through 1D, are exclusively OR'd (XOR) with a switchable fixed pattern as shown in block 804 and as described above. The FEC BIP-8 parity byte is then calculated (block 805) over its corresponding block of data. As previously described, FEC BIP-8 parity can be used to detect multiple errors and to appropriately enable or disable forward error correction depending on whether the number of errors detected is within the correction capability of the selected forward error correction algorithm.

After data is stored (block 806), FEC correction bits are then calculated (block 807) to determine the location of any errors. Correction of bit errors can then take place as shown in block 808 assuming that error correction has not been disabled. Upon completion of error correction, the B1 byte is then calculated and compared (block 809) using well-known SONET/SDH processing techniques. The Z0 bytes and S0 bits are then rearranged as shown in blocks 810 and 811, respectively, by copying the contents back into their respective rows. After the S0 bits are rearranged, B2 byte compensation is carried out (block 812) due to the S0 rearrangements. For example, the B2 byte requires compensation for removing the FEC correction bits from row 4. Other section overhead receive byte processing (block 813), B2 Byte calculation (block 814), and line overhead receive byte processing (block 815) is then carried out using well-known SONET/SDH processing techniques.

As shown in FIG. 8, the functions of blocks 803 through 812 can be incorporated and embodied in a FEC decoder, represented here functionally as block 825. FEC decoder (block 825) can be implemented using well-known techniques performed by hardware, software, application specific integrated circuits (ASICs), or a combination thereof As previously described, the B1 and B2 bytes in this embodiment are kept intact for transmission. As such, the B2 byte must be compensated to account for the rearrangements and insertion of the FEC bytes. For example, B2 byte compensation due to the S0 rearrangements (block 706) is required because moving the contents of the S0 bits in row 4 to row 5 results in overwriting the contents of the applicable row 5 bit locations, e.g., time slots. Consequently, B2 byte compensation is required to maintain accurate parity within row 5, e.g., by subtracting the overwritten row 5 time slots from B2 parity. Similarly, B2 byte compensation is required to maintain accurate parity within row 4 after the FEC bytes are inserted (block 708). It should also be noted that, in certain implementations, shifting contents between time slots may not necessarily impact B2 parity depending on which time slots are selected for carrying out the shifting.

Figure 9:
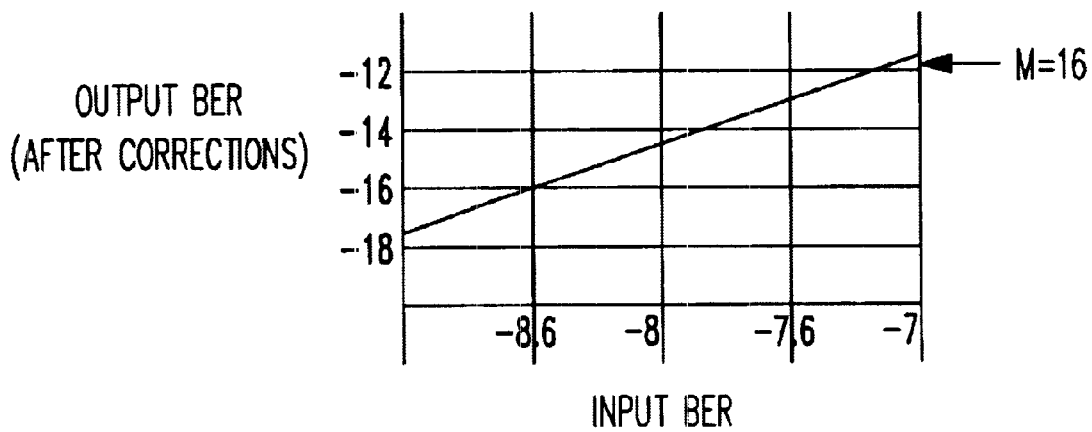
FIG. 9 is a graph illustrating the bit error rates achieved according to one exemplary embodiment of the invention.
Figure 10:
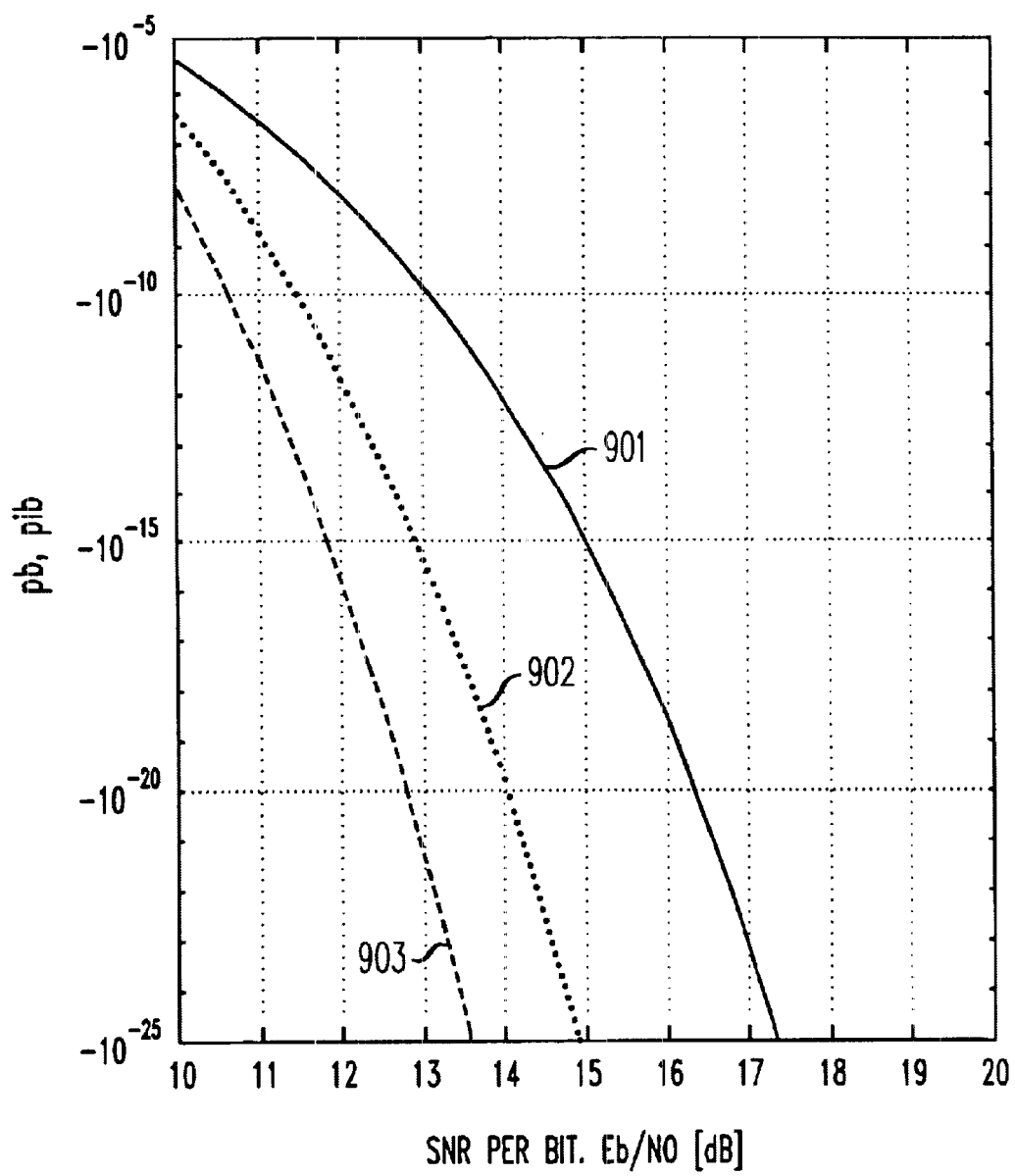
FIG. 10 is graph illustrating the signal to noise ratios achieved according to exemplary embodiments of the invention.

As previously indicated, the embodiments shown and described herein are only meant to be illustrative and not limiting. For example, in the above-described embodiments, 5 FEC bytes (4 bytes of correction bits and 1 byte of BIP-8 parity) are mapped for each of the 4 blocks in a given row so that a total of 20 FEC bytes are mapped into each row. However, it should be noted that the mapping scheme according to the principles of the invention can be used to map up to 48 FEC bytes per row. Accordingly, the number of blocks per row and the number of FEC bytes per block may vary depending on the particular forward error correction code selected for the application and other factors previously described. One of many examples of a suitable forward error correction algorithm that can be mapped to a STS-192 signal according to the principles of the invention is a double bit error correction BCH code (i.e., BCH-2). Some of the performance advantages associated with using a BCH-2 code in conjunction with the mapping scheme of the invention are illustrated in FIGS. 9 and 10. In particular, FIG. 9 shows a plot of input bit error rate (BER) and output BER after corrections using a BCH-2 code having a code length of 16, i.e., 16 correction bytes. FIG. 10 illustrates bit error rate, both corrected and uncorrected, as a function of signal to noise ratio (SNR). As shown, curve 901 represents an uncorrected bit error rate, curve 902 represents a bit error rate corrected using a single-error correcting Hamming code according to the principles of the invention, and curve 903 represents a bit error rate corrected using a double bit error correction BCH-2 code according to the principles of the invention. Performance advantages will of course vary depending on the type and strength of the forward error correction code selected. Consequently, the performance advantages shown in FIGS. 9 and 10 are only meant to be illustrative and not limiting.

Figure 11:
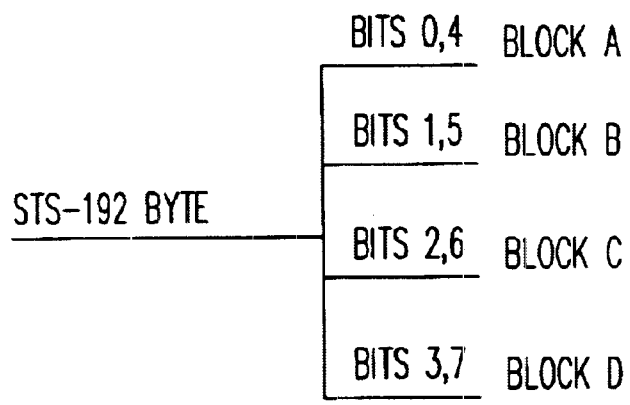
FIG. 11 is a simplified diagram illustrating an interleave sequence for the mapping scheme according to the principles of the invention.

According to another aspect of the invention, a burst error correction capability can be obtained by bit interleaving the forward error correction blocks as shown in FIG. 11. In particular, bit interleaving improves the burst error correction capability because multiple contiguous bit errors will be mapped to different forward error correction blocks and each forward error correction block can correct multiple errors.

As previously indicated, forward error correction can be applied to an entire SONET frame so that errors can be corrected in both the transport overhead and payload, with some exceptions. In general, the FEC blocks should not cover the FEC start byte, the FEC BIP-8 bytes, section overhead in rows 1–3, the B2 bytes, and the rearranged Z0 bytes and S0 bits. For example, the FEC start byte may change values during transmission as a result of a facility defect, for example. As such, applying FEC to the start byte may result in a false correction.

Section overhead also should not be covered by FEC blocks if a line terminating element to line terminating element capability is desired. For example, section overhead may be overwritten at regenerators (e.g., section terminating elements), which could cause false corrections if FEC blocks covered these overwritten bytes. Consequently, if a section overhead row was covered by a FEC block, then regenerators would always need to provide FEC decoding and encoding, which would add additional delay. Section overhead can therefore be handled as follows.

In one illustrative embodiment, section overhead bytes for rows 1–3 are assumed to be zero for purposes of FEC encoding and decoding. That is, a zero is assigned for each FEC correction bit corresponding to the section overhead bytes. As such, a regenerator can simply pass through the FEC correction bytes and also the FEC start byte, rearranged Z0 bytes, and the FEC BIP-8 bytes without performing any FEC encoding or B2 byte compensation. Although errors in the section overhead will not be corrected using this approach, additional delay is avoided which would otherwise occur as a result of FEC decoding and encoding at regenerators.

It may be desirable in some applications that FEC blocks do not cover the B2 and Z0 bytes and S0 bits because of the rearrangements. If this is the case, then these bytes and bits can be handled as follows. The B2 bytes are assumed to be zero for both FEC encoding and decoding. This implementation serves to eliminate some feedback paths from B2 after it is compensated for the FEC calculation function. The Z0 bytes (row 1) and S0 bits (row 4) are rearranged to preserve the contents as previously described. Therefore, in the receive direction, the preserved values, which are not corrected, overwrite the Z0 and S0 contents.

The FEC BIP-8 bytes are also assumed to be zero from an encoding and decoding perspective because FEC BIP-8 is used to determine whether or not to perform a correction. So, in the receive direction, the FEC BIP-8 bytes are processed prior to FEC decoding and correction. Consequently, there is no value added by correcting the FEC BIP-8 parity bytes.

Similar exceptions may be necessary for applying forward error correction scheme to other types of signals depending on operational or signal structure limitations specific to the particular signal. Consequently, techniques that are similar to those described above may be employed in modifying the mapping approach and application of forward error correction for a given signal structure depending on the particular exceptions. It should also be noted that the techniques described above are only meant to be illustrative and not limiting. For example, an all-ones approach may be used instead of an all-zeros approach.

According to another aspect of the invention, forward error correction can also be enabled and disabled based on different criteria or events. For example, forward error correction can be enabled/disabled based on the FEC start byte value, facility defects, FEC BIP-8 error count, FEC syndrome errors, hardware/software commands, and the like. Among other advantages, judicious control of forward error correction according to the principles of the invention can therefore prevent miscorrections, e.g., error multiplications, and to improve performance monitoring count accuracy.

Minimizing delay in a forward error correction scheme is a significant consideration for many SONET applications. For example, virtual concatenation, which is a way to handle many STS-1 signals as a group without carrying them as a contiguous bundle, requires minimal differential delay among the STS-1 signals. Protection switching is another application that is very sensitive to delay. For example, switching decisions in hardware-based protection switching and hitless protection switching schemes must occur with minimal delay. Some protection switching schemes, such as bi-directional line switched rings, require a handshaking protocol that is carried in the K1/K2 bytes of the SONET overhead. Consequently, these bytes must be sent between network elements as fast as possible. As the propagation delay increases, the transfer of the K1/K2 bytes takes longer, and hence, longer switching times will result. In view of these and other delay-sensitive applications, the mapping scheme according to the principles of the invention can be beneficially applied to achieve extremely low delays while improving the overall bit error rate performance of a system.

According to another aspect of the invention, a provisionable forward error correction capability is provided in which forward error correction processing can occur at the SONET section layer or the SONET line layer depending on the application. For example, forward error correction processing at the line layer may be advantageous when overall network delay is the most significant consideration. For example, when processing at the line layer according to the principles of the invention, a pass-through function is employed at regenerators whereby forward error correction bytes in the first three rows of a SONET frame are passed through. Conversely, forward error correction processing at the section layer may be advantageous when overall network delay is not as important as achieving the lowest possible bit error rate.

The embodiments shown and described herein for mapping forward error correction on a row-by-row basis may be incorporated in devices and systems using techniques well known to one skilled in the art. For example, the forward error correction mapping scheme may be embodied in an application specific integrated circuit (ASIC) using VLSI technology for a SONET or SDH terminal network element.

It should be understood that the particular embodiments and applications described above are only illustrative of the principles of the invention. Those skilled in the art may devise other suitable implementations, without departing from the spirit and scope of the teachings herein, for other signal structures and rates. For example, the principles of the invention may be employed for SONET and SDH signal rates other than STS-192/STM-64 by modifying mapping locations for the various FEC correction bits and bit interleaved parity bits consistent with the teachings herein. Furthermore, the principles of the invention may be applied to any type of signal structure that is conducive to a row-by-row mapping of forward error correction to improve bit error rate performance while minimizing memory requirements and associated delay. Accordingly, the scope of the invention is limited only by the claims that follow.

What is claimed is:

1. A method of improving the bit error rate performance of an optical transmission system, wherein a signal supplied by the system comprises a plurality of signal frames, each signal frame having a predetermined number of rows, the method comprising the steps of:
   inserting a predetermined number of forward error correction bytes into predetermined overhead bytes in a signal frame on a row-by-row basis, such that the forward error correction bytes in a particular row apply to data in a preceding row of the signal frame; and
   processing only the forward error correction bytes in the particular row to detect and correct errors within the preceding row.

2. The method according to claim 1, further comprising the step of, prior to processing the forward error correction bytes in a row, storing approximately one row of the signal frame.

3. The method according to claim 1, wherein the optical transmission system is a system selected from the group consisting of a SONET-based system and a SDH-based system.

4. The method according to claim 3, wherein the signal is selected from the group consisting of a STS-192 signal and a STM-64 signal, both operating at a transmission rate of approximately 10 Gb/s.

5. The method according to claim 4, wherein the predetermined number of rows is nine.

6. A method of providing forward error correction for signals supplied by an optical transmission system, each signal comprising a plurality of signal frames, each signal frame having a predetermined number of rows, the method comprising the steps of:

partitioning each row in a signal frame into a predetermined number of segments;

inserting forward error correction bytes into predetermined overhead bytes in the signal frame on a row-by-row basis, wherein a predetermined number of forward error correction bytes apply to each segment within a row and wherein the forward error correction bytes in a particular row apply to data in a preceding row of the signal fame; and processing only the forward error correction bytes in the particular row to detect and correct errors within the preceding row.

7. The method according to claim 6, further comprising the step of, prior to processing the forward error correction bytes in a row, storing approximately one row of the signal frame.

8. The method according to claim 7, wherein the predetermined number of segments is four so that each segment is representative of approximately one-fourth of a row of data.

9. The method according to claim 8, wherein the predetermined number of forward error correction bytes is four.

10. The method according to claim 6, wherein the optical transmission system is a system selected from the group consisting of a SONET-based system and a SDH-based system.

11. The method according to claim 10, wherein the signal is selected from the group consisting of a STS-192 signal and a STM-64 signal, both operating at a transmission rate of approximately 10 Gb/s.

12. The method according to claim 11, wherein each segment comprises approximately 34,560 bits.

13. The method according to claim wherein 11, for a particular row in the signal frame, the step of inserting the forward error correction bytes comprises inserting the forward error correction bytes on a bit-by-bit basis into at least one bit location of a succeeding number of overhead bytes.

14. The method according to claim 6, further comprising the step of inserting error detection bytes into predetermined overhead bytes of the signal frame on a row-by-row basis, wherein a predetermined number of error detection bytes apply to each segment within a row.

15. The method according to claim 14, wherein the error detection bytes are processed to detect a total number of errors in each segment, and wherein forward error correction processing is enabled and disabled on a row-by-row basis as a function of the number of errors detected within a row.

16. The method according to claim 15, wherein, if the total number of errors detected exceeds a predetermined threshold, forward error correction processing is disabled to avoid false corrections, and wherein, if the total number of errors detected is less than or equal to the predetermined threshold, forward error correction processing is enabled.

17. The method according to claim 16, wherein the error detection bytes comprise bit interleaved parity bytes.

18. The method according to claim 14, further comprising the step of compensating particular overhead bytes to account for parity changes resulting from insertion of the forward error correction bytes and insertion of the error detection bytes.

19. The method according to claim 6, further comprising the steps of:

inserting a forward error correction start byte into a predetermined overhead byte in the signal frame; and enabling and disabling forward error correction processing as a function of the value of the start byte.

20. The method according to claim 6, further comprising the steps of:

rearranging overhead bytes in selected rows in the signal frame to preserve the contents thereof, wherein the step of rearranging includes copying and moving contents of overhead bytes between selected rows in the signal frame prior to inserting the forward error correction bytes in the selected rows; and compensating particular overhead bytes to account for parity changes resulting from rearranging the overhead bytes in selected rows.

21. The method according to claim 6, wherein the forward error correction bytes corresponding to each of the segments within a row are bit interleaved within the predetermined overhead bytes, wherein each forward error correction byte includes forward error correction bits from each of the segments within the row so that multiple contiguous errors within a row of the signal frame are detectable and correctable.

22. The method according to claim 10, wherein the forward error correction processing can be selectively enabled and disabled at a section layer or at a line layer.

23. An apparatus for improving the bit error rate performance of an optical transmission system, wherein a signal supplied by the system comprises a plurality of signal frames, each signal frame having a predetermined number of rows, the apparatus comprising:

means for inserting forward error correction bytes in predetermined overhead bytes in a signal frame on a row-by-row basis, such that the forward error correction bytes in a particular row apply to data in a preceding row of the signal frame; and means for processing only the forward error correction bytes in the particular row to detect and correct errors within the preceding row.

24. The apparatus according to claim 23, wherein the means for inserting comprises a forward error correction encoder and the means for processing comprises a forward error detection decoder.

25. The apparatus according to claim 23, wherein the means for processing further comprises memory for storing approximately one row of the signal frame prior to processing the forward error correction bytes in a row.

26. The apparatus according to claim 23, wherein the optical transmission system comprises a system selected from the group consisting of a SONET-based system and a SDH-based system.

27. The apparatus according to claim 26, wherein the signal is selected from the group consisting of a STS-192 signal and a STM-64 signal, both operating at a transmission rate of approximately 10 Gb/s.

* * * * *